(12) United States Patent
McCarthy et al.

(10) Patent No.: US 7,092,888 B1
(45) Date of Patent: Aug. 15, 2006

(54) UNSUPERVISED TRAINING IN NATURAL LANGUAGE CALL ROUTING

(75) Inventors: Daniel J. McCarthy, Belmont, MA (US); Premkumar Natarajan, Sudbury, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 846 days.

(21) Appl. No.: 10/279,336

(22) Filed: Oct. 24, 2002

Related U.S. Application Data

(60) Provisional application No. 60/376,345, filed on Apr. 29, 2002, provisional application No. 60/334,758, filed on Oct. 26, 2001.

(51) Int. Cl.
    G10L 15/06 (2006.01)
(52) U.S. Cl. .................................. 704/277; 379/88.01
(58) Field of Classification Search ................ None
    See application file for complete search history.

(56) References Cited

U.S. PATENT DOCUMENTS 5,621,859 A    4/1997    Schwartz et al. .......... 395/2.65

OTHER PUBLICATIONS

J.R. Rohlicek, P. Jeanrenaud, K. Ng, H. Gish, B Musicus, and M. Siu, "Phonetic Training and Statistical Language Modeling for Word Spotting," IEEE ICASSP 93, pp. II-459-466.
P. Jeanrenaud, K. Ng, M. Siu, J.R. Rohlicek, H. Gish, "Phonetic-Based Word Spotter: Various Configurations and Application to Event Spotting," Eurospeech 93.
F. Jelinek, "Statistical Methods for Speech Recognition" MIT Press, 1997, pp. 57-78.
John Golden, Owen Kimball, Man-Hung Siu, and Herbert Gish, "Automatic Topic Identification for Two-Level Call Routing," Proc. ICASSP, vol. I. pp. 509-512, 1999.
S. Kullback, R.A. Leibler, "On Information and Sufficiency," Ann. Math. Stat. vol. 22, pp. 79-86, 1951.

(Continued)

*Primary Examiner*—Susan McFadden
(74) *Attorney, Agent, or Firm*—Leonard C. Suchtya, Esq.; Joel Wall, Esq.

(57) ABSTRACT

A method of training a natural language call routing system using an unsupervised trainer is provided. The unsupervised trainer is adapted to tune performance of the call routing system on the basis of feedback and new topic information. The method of training comprises: storing audio data from an incoming call as well as associated unique identifier information for the incoming call; applying a highly accurate speech recognizer to the audio data from the waveform database to produce a text transcription of the stored audio for the call; forwarding outputs of the second speech recognizer to a training database, the training database being adapted to store text transcripts from the second recognizer with respective unique call identifiers as well as topic data; for a call routed by the call router to an agent: entering a call topic determined by the agent into a form; and supplying the call topic information from the form to the training database together with the associated unique call identifier; and for a call routed to automated fulfillment: querying the caller regarding the true topic of the call; and adding this topic information, together with the associated unique call identifier, to the training database; and performing topic identification model training and statistical grammar model training on the basis of the topic information and transcription information stored in the training database.

29 Claims, 7 Drawing Sheets

OTHER PUBLICATIONS

A.P. Dempster, N. Laird and D. Rubin. "Maximum Likelihood from Incomplete Data via the EM Algorithm", Journal of the Royal Statistical Society (B), vol. 39, No. 1, pp. 1-22, 1977.

F. Jelinek, R.L. Mercer and S. Roukos. "Principles of Lexical Language Modeling for Speech Recognition", In Readings in Speech Recognition, edited by A. Waibel and Kai-Fu Lee, pp. 651-699, Morgan Kaufmann Publishers, 1990.

H. Witten and T. C. Bell. "The Zero Frequency Estimation Of Probabilities of Novel Events in Adaptive Text Compression", IEEE Transactions on Information theory, vol. 7, No. 4, pp. 1085-1094, 1991.

P. Placeway, R. Schwartz, P. Fung and L. Nguyen. "Estimation of Powerful LM from Small and Large Corpora", Proceedings of the International Conference on Acoustics, Speech and Signal Processing, vol. 2, pp. 33-36, 1993.

UNSUPERVISED TRAINING IN NATURAL LANGUAGE CALL ROUTING

CROSS-REFERENCE TO RELATED APPLICATIONS

This application claims benefit of U.S. Provisional Application No. 60/334,758, filed Oct. 26, 2001 and U.S. Provisional Application No. 60/376,345, filed Apr. 29, 2002, each of which is incorporated herein by reference.

BACKGROUND OF THE INVENTION

1. Field of the Invention

The present invention relates to unsupervised training techniques for training natural language call routing systems to improve speech recognition, topic recognition and language models, and a system and method therefor.

2. Discussion of the Related Art

Companies that expect to receive large numbers of telephone calls from customers seeking to access information or perform transactions typically employ call centers to act as the initial interface with the callers. Call centers generally include hardware and software, such as private branch exchanges, routers, interactive voice response systems (IVRs), and other components, that direct callers to a person, software program or other source of information best suited to meet the needs of the caller.

To date, the vast majority of such systems have been touch-tone systems. Call centers using touch-tone technology typically employ a complex hierarchy of touch-tone menus to provide self-service in the IVR or to enable skills-based routing. Skills-based routing is a known technique that attempts to match the caller to an automated fulfillment application, or, if no appropriate automated fulfillment is available, to a customer service agent who has the skill set to handle the caller's needs. Ideally, such routing allows the call center to save on agent labor and training costs while improving customer service.

However, it has been found that as menu complexity increases, IVR usage decreases because callers become frustrated, and routing mistakes increase because of caller confusion. Such problems typically manifest themselves in the caller pressing "0" or "pounding out", or doing nothing, as if the caller had a rotary dial telephone, in an effort to short-circuit the IVR system and connect to a live agent. The enterprise can benefit substantially by increasing usage of the IVR and decreasing routing mistakes, in turn decreasing the amount of time that agents must spend on each call. The less time agents spend on tasks that could be automated in the IVR, the more time they have to perform important revenue generating functions such as sales.

Analysis of how effective complex menu hierarchies are at routing callers has shown that typically only 60% of callers on average are routed either to the correct agent or self-service, i.e., automated fulfillment, destination in the IVR. Callers misroute themselves because they do not understand the menu choices, mis-key their selection, or simply press "0" to get to an agent who must then determine the correct destination.

Natural language call routing systems have been developed with the goal of helping to solve these problems by cutting through the tangle of call flow options and letting callers state their purpose in their own words. As a comparison of FIGS. 1A and 1B will illustrate, what once took many layers of sub-menus with touch-tones can be handled by a single open-ended prompt using natural language call routing.

As shown in FIG. 1A, in a touch-tone, menu-driven system, a caller will encounter a main menu and touch tone/prompt 100. Typically, the menu prompts the caller to press a touch tone key to access, for example, billing information or other services. In response to the touch tone entry, the caller may encounter a second level of touch tone/prompts 102. Some of these second level prompts may result in the call being terminated, while others will lead, by further touch tone entries by the caller, to a third level of touch tone/prompts 104, and, in some cases, where automated fulfillment does not satisfy the customer's needs, to specialists, such as Specialist A 106, Specialist B 107 and Specialist C 108. Each specialist would typically be responsible for a particular customer service.

On the other hand, as is illustrated in FIG. 1B, in a natural language call routing system, a main menu/call router prompt 200 is provided that, in response to a voice input, routes the caller to one of agents 206, 207, and 208 or automated fulfillment 209. Natural language call routing substantially improves the overall rate of successful routes because it routes callers more accurately than they can route themselves using the touch-tone menus, and there is a higher rate of caller participation because the interface is more user-friendly than the touch-tone menu system.

In a conventional natural language call routing system, illustrated in FIG. 2, the caller is greeted with an open-ended prompt, such as "Please tell me, briefly, the reason for your call today." Callers may then respond in their own words. Using statistical grammars and topic models 302, speech recognizer 304 transcribes the spoken response into a sequence of recognized words. The language understanding engine, or topic identifier, 306 then uses statistical topic-identification technology to determine the reason for the call from the sequence of recognized words and the trained topic models. Finally, the IVR router 308 transfers the call to an area of the IVR where the caller can self-serve, using automated services, or to a customer service agent. In cases where the system is not sufficiently confident of the topic, the caller will hear a directed re-prompt that lists the available options. This style of re-prompting guides the caller to an acceptable response and increases the overall routing accuracy.

The benefit of using a natural language call routing system is fundamentally dependent upon the routing accuracy. The best natural language call routing systems use statistical models both for speech recognition and language understanding. By using statistical n-gram grammars for speech recognition, it is possible to robustly model a huge set of possible customer queries. Unlike phrase-based grammars that work only when the customer utters one of a pre-defined set of sentences (i.e., the grammar), statistical n-gram grammars allow the recognition of customer utterances where the customer uses his or her own natural style to describe the reason for their call. This is achieved by assigning a continuous statistical score to every hypothesized sequence of words. N-gram models are well-known and are described, for example, in F. Jelinek, R. L. Mercer and S. Roukos, "Principles of Lexical Language Modeling for Speech Recognition", in Readings in Speech Recognition, edited by A. Waibel and Kai-Fu Lee, pages 651–699, Morgan Kaufmann Publishers, 1990, H. Witten and T. C. Bell. "The Zero Frequency Estimation Of Probabilities of Novel Events in Adaptive Text Compression", IEEE Transactions on Information theory, volume 7, number 4, pages 1085–1094, 1991, and P. Placeway, R. Schwartz, P. Fung and L. Nguyen. "Estimation of Powerful LM from Small and Large Corpora", Proceedings of the International Conference on Acoustics, Speech and Signal Processing, Volume 2, pages 33–36, 1993. On the other hand, phrase-based grammars are far more discrete bi-modal: they assign a high score to an utterance that conforms with the pre-defined grammar and a very low score to a non-conforming utterance.

After speech recognition has been performed to determine the content of the customer's utterance, the second part of the natural language call routing solution is topic identification, which uses the statistical topic identification engine, or topic identifier. The topic identifier models the statistical relationship between the words used in the caller inquiries for specific topics.

Before deployment, and possibly at other times as well, the topic identifier undergoes a training process in which a matrix of word probabilities, i.e., the likelihood of occurrence of each word, for each topic is generated. The training process also calculates the prior probability of each topic, i.e., the probability that the next caller will ask about that topic. These two parameters are supplied as inputs to the topic identifier, which then determines the topic by applying statistical techniques like Bayes law to generate the likelihoods for each topic given the observed word sequence. Statistical speech recognition and topic-identification systems are well-known and are described, for example, in F. Jelinek, "Statistical Methods for Speech Recognition", MIT Press, 1997, pp. 57–78, and John Golden, Owen Kimball, Man-Hung Siu, and Herbert Gish, "Automatic Topic Identification for Two-Level Call Routing," Proc. ICASSP, vol. I, pp. 509–512, 1999.

An ordinary recognizer, without the language-understanding component, can be used alone to identify the topics for routing. However, such usage requires phrase-based grammars that explicitly list the various sentences that an "expert" believes the customer might reasonably say while describing the reason for their call. Optimal routing performance is obtained by adding a language-understanding engine, such as the topic identifier, that is trained on responses from actual customers, to capture all the variability of their speech. In terms of error rate, a natural language call routing system using statistical models for both speech recognition and topic identification outperforms a system using an ordinary phrase-based grammar recognizer by a factor of approximately 2 to 1.

Deployment of a natural language call routing system is a well-defined process that involves more than simply initiating operation of an off-the-shelf item. To ensure optimum performance, the routing system must be tuned to meet the particular needs of the call center in which it will be deployed. Deploying a natural language call routing system on a production IVR is a process in which configuration and installation generally proceed in four steps.

First, the topics that will form the basis for routing calls in the call center are identified and defined. These topics preferably should cover the range of reasons why customers call the center. Typically, each topic that will trigger routing to a specialist or self-service automation should receive at least 2% of caller traffic; any topic receiving less than this should be either combined with other similar topics into a larger, more general category, or categorized as a topic that should go to a general agent.

Second, responses to an open-ended routing prompt must be collected from real customers. One possible technique is to use what is known in the art as a "Wizard-of-Oz" system, in which real customer service agents listen to and route the calls, using pre-recorded prompts to guide the callers. This type of a system gives callers a simulated experience of a natural language call router without any actual investment in speech recognition technology. Another technique is to use a prototype of the eventual speech recognition system where the speech and language models are created based on anticipated caller responses. Until the models are retrained they will perform sub-optimally, which may be sufficient to expose to a limited number of customers in a trial situation simply to capture the caller responses. With either technique, the customers' responses are recorded for later analysis.

Third, the customer responses collected in the second step are transcribed and annotated with the correct routing topic. This is typically a manual process.

Fourth, using the annotated data, the speech recognition and the topic identification models are trained to correctly classify caller responses to the initial prompt. Training involves maximum likelihood estimation of both standard n-gram language models for speech recognition, such as are described in the Jelinek et al. reference, and statistical (e.g., Bayesian) models for topic identification such as are described in the Golden et al. reference. The output of this step forms the initial configuration for the natural language call router.

A fifth step may sometimes be required to train voice models to recognize regional accents. Most commercial speech recognizers have standard voice models that provide acceptable performance across a wide footprint, but the best performance is obtained by training the acoustic models on regional data. Training acoustic models on data collected from the deployment call-centers is an optional fifth step that can lead significant benefits in performance. While most commercial speech recognizers are shipped with so called "stock models" that deliver acceptable performance across a wide footprint, experimental evidence clearly demonstrates the usefulness of re-training, or adapting, the models to data from the current domain/deployment site. An important benefit of the increase in accuracy from better acoustic models is that this improvement is independent of the improvement in the language models. As such any newly correctly recognized words provide additional information for training better language models as well as better topic models.

With the completion of these four steps, or five steps with voice model training, the call routing system can be deployed on a production IVR platform. Aside from replacing the touch-tone routing menus with the natural language call routing, and speech-enabling sub-dialogues as needed (e.g., to collect user identification information), the call flows from the touch-tone IVR may remain unchanged.

FIG. 3 illustrates a conventional approach for voice and language model training for a call routing application. In this approach a trainer 5 utilizes human transcription and annotation. The natural language call routing application 1 to be trained has a speech recognizer 2 which converts the caller speech into text, a topic ID classifier 3 that determines the topic from the text, and instructs the IVR router where to send the call, whether to an automated self-service 13 or to a call center agent 14.

The voice and language model training process includes seven steps. First, spoken responses to a routing prompt are recorded to collect audio data, which is then stored in a waveform database 6. This can be done using an audio logging feature that would typically be provided with an IVR platform. Second, the collected data is transcribed by hand and annotated with a topic at 7 that would indicate how the spoken response should be routed. The topics and transcripts are stored in a training database 8, along with an identifier for each entry that allows that entry to be uniquely correlated to the particular call from which the information was gathered. Third, feature selection 9 is performed. The features are the words from the training data; these must be ranked by how well they help to separate the training examples into their labeled topics. The feature selection process increases the efficiency of the speech recognition process by reducing the size of the active dictionary that must be searched. For example, the well-known Kullback-Leibler distance metric (KLD), which measures the cross-entropy between the query words and the topic distributions, as described in S. Kullback, R. A. Leibler, "On Information and Sufficiency," Ann. Math. Stat. Vol 22, pp 79–86, 1951, may be used. For a given topic and word, if the KLD is large, it means that this word occurs much more frequently in queries about this topic than any other topic and thus should be useful in categorizing future queries. Finally the 300–500 highest ranked words, or more, are selected on this basis.

Fourth, a topic trainer 12 uses the transcribed and annotated data in the training database 8 to build statistical models of how the selected feature words relate to the topics. Preferably, the topic trainer 12 uses a maximum likelihood estimation algorithm to build the statistical models. With maximum likelihood estimation, the parameters for the statistical models that maximize the likelihood of generating the observed training data are selected. The parameters of the model, mentioned above, are the matrix of $p(w_i|T_j)$, the probabilities of each keyword given each topic, and $p(T_j)$, the prior probabilities of each topic. Estimation of these parameters is achieved by using a maximum likelihood method such as the one described in the Golden et al. article. However, other statistical methods can be used. The output of the trainer forms topic classifier configuration data and is input to the Topic ID classifier 3.

Fifth, a statistical grammar builder 11 for a speech recognizer is run on the collected transcribed data. The statistical grammar builder 11 uses the vocabulary found in the training data, typically greater than 1000 words, and the list of keywords selected by the feature selection 9 to construct statistical grammar relating to approximately 800 words to be input to the speech recognizer 2. The set of words used by the topic identification system to classify speech recognition output is called the keyword set or keywords. The keyword list could contain all the words in the recognition vocabulary but is usually a subset of the same. In order to accurately recognize the keywords it is beneficial to add extra words into the grammar for the speech recognizer. Research has shown the best words to add are either the most common non-keywords or all of the words that precede or follow keywords or both. It has been found that for training purposes, the most common non-keywords approach was most effective.

The most common non-keywords algorithm works as follows:
1. Create a word list containing all non-keywords from the training corpus
2. Determine the frequency of each word in the list
3. Rank the words by frequency, counting the number of words at each frequency
4. Choose the target maximum percentage of non-keywords to add. Namely what ratio of keywords to non-keywords is desired; use 3:1 as the default.
5. Using the frequency distribution, count down from the top frequency until the cumulative word count exceeds the target non-keyword percentage, or ⅓ of the number of keywords. This determines the minimum frequency.
6. Add all words that meet or exceed this minimum frequency.

Note that this approach may add more non-keywords than the target ratio, however, it circumvents selecting among equally popular non-keywords.

Sixth, the speech recognizer 2 uses a speech recognition process to turn input speech into text in an online system using the resulting grammar. The speech recognizer 2 must support statistical language models, that is, must be able to use statistical grammar input to it in the speech recognition process. Finally, topic classifier 3 takes text output by the speech recognizer 2 and, using the input classifier configuration data, generates a list of topics and confidence scores that it passes to the IVR routing mechanism 4. The topic identifier calculates the posterior probability of each topic given the input words or caller utterance, $p(T_j|u)$. Using a Bayesian approach this can be calculated from the conditional probability of the utterance given the topic, $p(u|T_j)$, and the prior probabilities of the topics, $p(T_j)$. It uses a multinomial model of the keywords for the former, $p(u|T_j)$ =product over all keywords $w_i = p(w_i|T_j)^{n_i(u)}$, where $n_i(u)$ =number of times that keyword $w_i$ appears in u. The prior probabilities of the topics $p(T_j)$ and the probabilities of the words given the topics, $p(w_i|T_j)$, have been estimated during training, as described above. The confidence scores indicate how relevant each topic was to the input text and are typically expressed as a percentage. The topic classifier 3 then maximizes $p(T_j|u)$ over all topics to select the most likely topic for the input utterance.

The acoustic model trainer, used for example to assist the speech recognizer in recognizing regional accents, may utilize a vector-quantized (VQ) model. In order to train the (VQ) acoustic model, it is required first to build a phonetic dictionary of all words in the transcribed text. The dictionary, transcribed text and the associated speech waveforms are then used to train the quantization codebooks and the associated probability mass functions in the VQ model. Training is performed using the standard Baum-Welch algorithm, described, for example, in F. Jelinek, Statistical Methods for Speech Recognition, referenced above, that generates maximum likelihood estimates of the model parameters. The vocabulary used during recognition need not be the same as the training dictionary. Typically, interpolated models are created for new phoneme sequences that have not been seen during training.

As has been described above, in natural language call routing systems, speech recognition programs are used to help determine what the caller is saying. However, it is not enough simply to recognize the words spoken by the caller. Topics corresponding to the spoken words must be ascertained to allow routing of the call to the appropriate specialist. It is important to maintain, and even improve, the accuracy of the system over time, in the least expensive manner.

A conventional approach to such training has been described in connection with the conventional trainer 5 discussed above with respect to FIG. 3. However, in the conventional trainer 5, the important tasks of call transcription and topic annotation used to supply the training data are done manually. Such manual text transcription and topic annotation processes have been found to be a training bottleneck, substantially increasing the cost and the turn-around time for deploying improved configuration data.

SUMMARY OF THE INVENTION

The present invention addresses the problems of the prior systems by providing techniques for unsupervised and offline training of acoustic and language models for use by a natural language call routing system. In accordance with the present invention, manual transcription of audio in the trainer is replaced with the output of a highly accurate speech recognizer, while manual topic annotation is replaced with techniques for collecting topic feedback from the call-center agents and the callers themselves. Finally, the unsupervised training process trains the new acoustic and language models and assesses when the new models are more accurate than the models currently in use.

In accordance with one aspect of the present invention, there is provided a method of training a natural language call routing system using an unsupervised trainer. The call routing system is adapted to associate a unique identifier to an incoming call and has a first speech recognizer adapted to recognize speech input from a caller and to output text corresponding to the input speech, a topic classifier adapted to identify a topic from the text output by the first speech recognizer, and a call router adapted to route the caller to an agent or an automated fulfillment in accordance with the identified topic. The unsupervised trainer is adapted to tune performance of the call routing system. The method of training comprises: storing, in a waveform database, audio data from an incoming call as well as associated unique identifier information for the incoming call; applying a second speech recognizer to the audio data from the waveform database to produce a text transcription of the stored audio for the call; forwarding outputs of the second speech recognizer to a training database, the training database being adapted to store text transcripts from the second recognizer with respective unique call identifiers as well as topic data; for a call routed by the call router to an agent: entering a call topic determined by the agent into a form; and supplying the call topic information from the form to the training database together with the associated unique call identifier; and for a call routed to automated fulfillment: querying the caller regarding the true topic of the call; and adding this topic information, together with the associated unique call identifier, to the training database; and performing topic identification model training and statistical grammar model training on the basis of the topic information and transcription information stored in the training database. Optionally, voice model training is performed on the basis of the topic information and transcription information stored in the training database.

In accordance with another aspect of the present invention, there is provided a system for unsupervised training of a natural language call routing system. The call routing system is adapted to associate a unique identifier to an incoming call and has a first speech recognizer adapted to recognize speech input from a caller and to output text corresponding to the input speech, a topic classifier adapted to identify a topic from the text output by the first speech recognizer, and a call router adapted to route the caller to an agent or an automated fulfillment in accordance with the identified topic. The unsupervised trainer is adapted to tune performance of the call routing system. The unsupervised training system comprises: a waveform database, adapted to store audio data from an incoming call as well as associated unique identifier information for the incoming call; a second recognizer adapted to be applied to the audio data from the waveform database to produce a text transcription of the stored audio for the call; a training database, the training database adapted to store text transcripts from the second recognizer with respective unique call identifiers as well as topic data; an online topic annotator including a form adapted to allow entry of a call topic determined by the agent for a call routed to the agent and, and a true topic entry unit for entry of a call topic gathered from querying the caller regarding the true topic of a call, for a call routed to automated fulfillment, the annotated topic information, together with the associated unique call identifier, being supplied to the training database together with the associated unique call identifier; a topic trainer adapted to perform topic identification model training on the basis of the topic information and transcription information stored in the training database; and a statistical grammar builder adapted to perform grammar model training on the basis of the topic information and transcription information stored in the training database. Optionally, there is provided a voice model trainer adapted to perform voice model training on the basis of the transcription information stored in the training database.

In accordance with yet another aspect of the present invention, there is provided a trainer for unsupervised training of a natural language call routing system. The call routing system is adapted to associate a unique identifier to an incoming call and having first speech recognizing means for recognizing speech input from a caller and outputting text corresponding to the input speech, topic classifying means for identifying a topic from the text output by the first speech recognizing means, and call routing means for routing the caller to an agent or an automated fulfillment in accordance with the identified topic. The trainer is adapted to tune performance of the call routing system and comprises: a waveform database, adapted to store audio data from an incoming call as well as associated unique identifier information for the incoming call; second speech recognizing means for producing, from the audio data from the waveform database, a text transcription of the stored audio for the call; a training database, the training database adapted to store text transcripts from the second recognizing means with respective unique call identifiers as well as topic data; online topic annotation means for providing to an agent a form adapted to allow entry of a call topic determined by the agent for a call routed to the agent and, and including a true topic entry unit for entry of a call topic gathered from querying the caller regarding the true topic of a call, for a call routed to automated fulfillment, the annotated topic information, together with the associated unique call identifier, being supplied to the training database together with the associated unique call identifier; topic training means for performing topic identification model training on the basis of the topic information and transcription information stored in the training database; and statistical grammar building means for performing grammar model training on the basis of the topic information and transcription information stored in the training database. Optionally, there is provided voice model training means for performing voice model training on the basis of the transcription information stored in the training database.

In accordance with still another aspect of the present invention, there is provided a method of training a speech recognition system using an unsupervised trainer. The speech recognition system is adapted to associate a unique identifier to an incoming call and has a first speech recognizer adapted to recognize speech input from a caller and to output text corresponding to the input speech, and an associated call router which routes the caller to an agent or an automated fulfillment, using some or all of the information provided by the caller. The unsupervised trainer is adapted to tune performance of the speech recognition system on the basis of feedback using both automatic and manual transcription. The method of training comprises: storing, in a waveform database, audio data from the incoming call as well as associated unique identifier information for the incoming call; applying a second speech recognizer to the audio data from the waveform database to produce a text transcription of the stored audio data for the call; forwarding outputs of the second speech recognizer to a training database, the training database being adapted to store text transcripts from the second recognizer with respective unique call identifiers as well as topic data; agents entering information which is being captured by the speech recognition system, determined by the agent, into a form; supplying the information from the form to the training database together with the associated unique call identifier; and performing voice model training on the basis of the transcription and audio information stored in the training database.

In accordance with another aspect of the present invention, there is provided a system for unsupervised training of a speech recognition system. The speech recognition system is adapted to associate a unique identifier to an incoming call and has a first speech recognizer adapted to recognize speech input from a caller and to output text corresponding to the input speech, and a call router adapted to route the caller to an agent or an automated fulfillment in accordance with information provided by the caller. The unsupervised training system is adapted to tune performance of the speech recognition system on the basis of feedback. The unsupervised training system comprises: a waveform database, adapted to store audio data from the incoming call as well as associated unique identifier information for the incoming call; a second speech recognizer adapted to be applied to the audio data from the waveform database to produce a text transcription of the stored audio data for the call; a training database adapted to store text transcripts from the second recognizer with respective unique call identifiers; an online annotator including a form adapted to allow entry of true information determined by the agent, for a call routed to the agent, the annotated topic information, together with the associated unique call identifier, being supplied to the training database together with the associated unique call identifier; and a voice model trainer adapted to perform voice model training on the basis of the transcription and audio information stored in the training database.

DETAILED DESCRIPTION OF THE PREFERRED EMBODIMENTS

As with regular touch-tone IVR applications, a natural language call routing system requires periodic updates. Such updates insure optimal call center performance as new products or features are introduced. Updating a natural language call routing system follows a process similar to that used during the initial configuration stage described above. The open-ended prompt remains unchanged. When new topics arise, a sufficient number of caller inquiries about the new topics must be collected. The calls must be transcribed and annotated with the correct routing topic. Before the call routing system can confidently recognize and route the new topics, the speech recognition and topic identification models are retrained to arrive at an optimally tuned configuration. The additional training can be done in the normal course of operation, or, in some cases, in the background during off-peak hours, for reasons to be developed below. The statistical grammar models for speech recognition are trained using the transcribed speech. The statistical models for topic identification are trained using the transcribed and annotated speech. If needed, new voice models can be trained using the transcribed data and the audio files. The output of these independent training processes forms the configuration data that is then used in the deployed system.

According to a preferred embodiment, The present invention is directed to an approach that improves the topic training functionality of the conventional trainer by providing an unsupervised approach to topic training that automates the speech transcription function of the trainer, while capturing topic identification data at convenient times in the call routing process. The training approach of the present invention can run in the background or in off-peak hours.

Figure 1A:
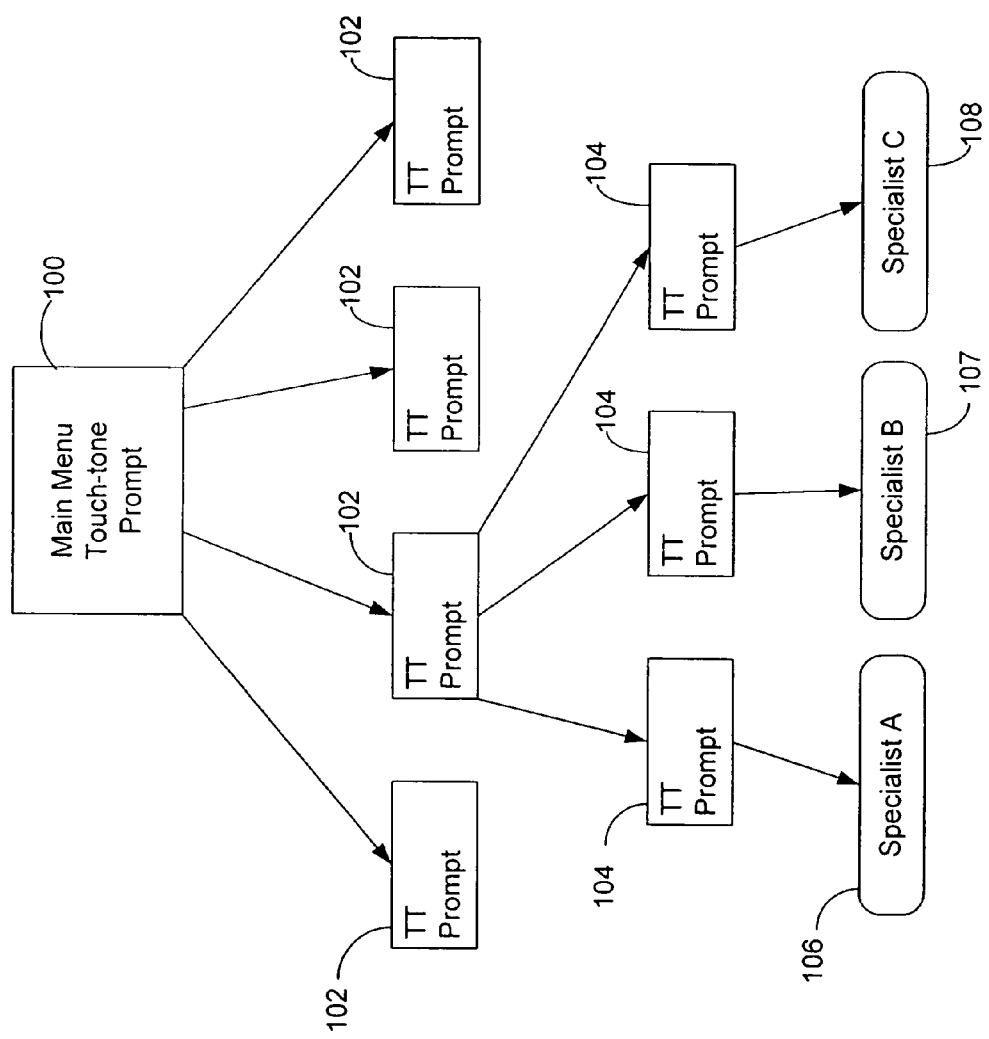
FIGS. 1A and 1B are call flow charts illustrating routing with hierarchical touch-tone menus versus natural language call routing.
Figure 1B:
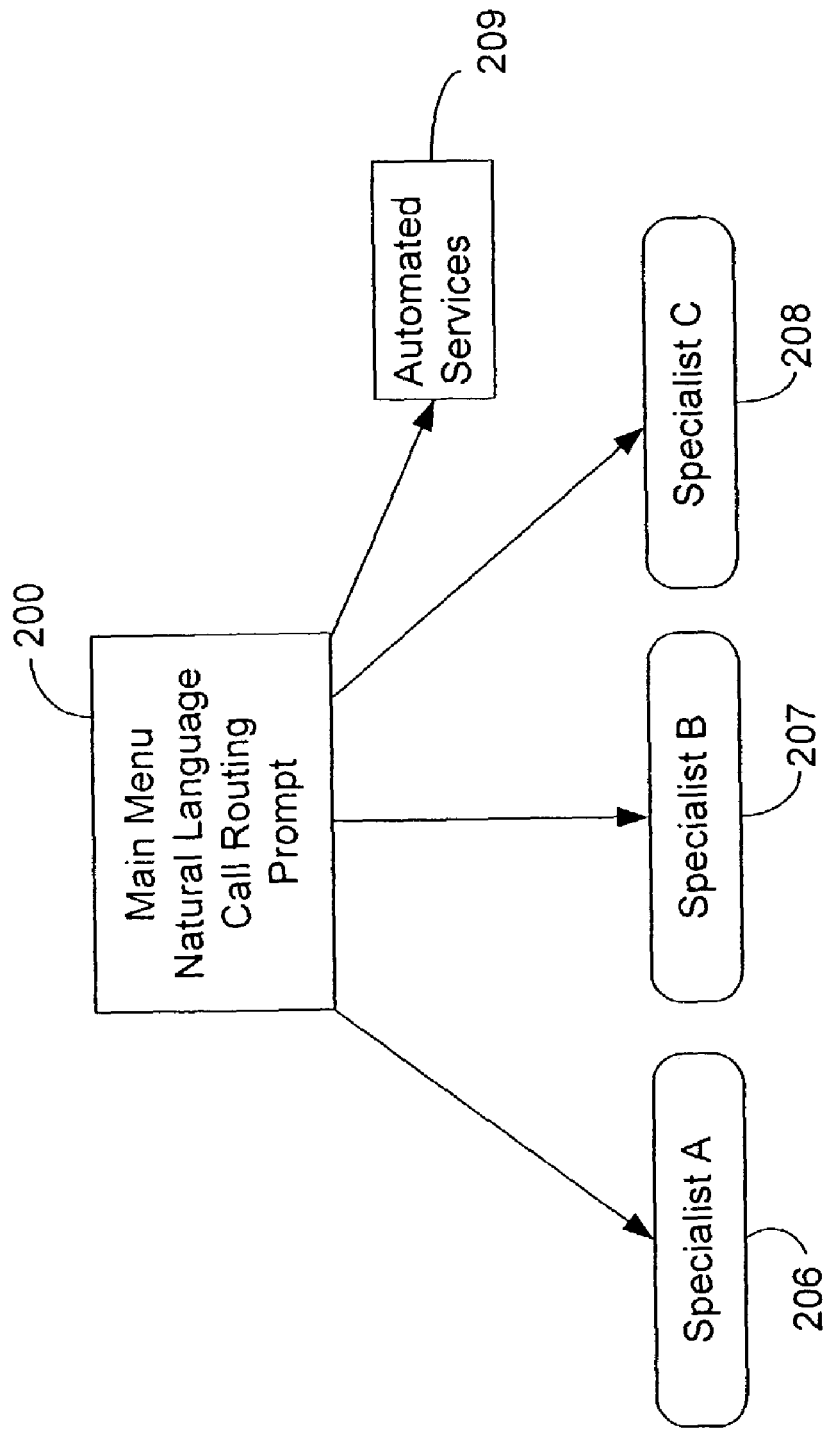
Figure 2:
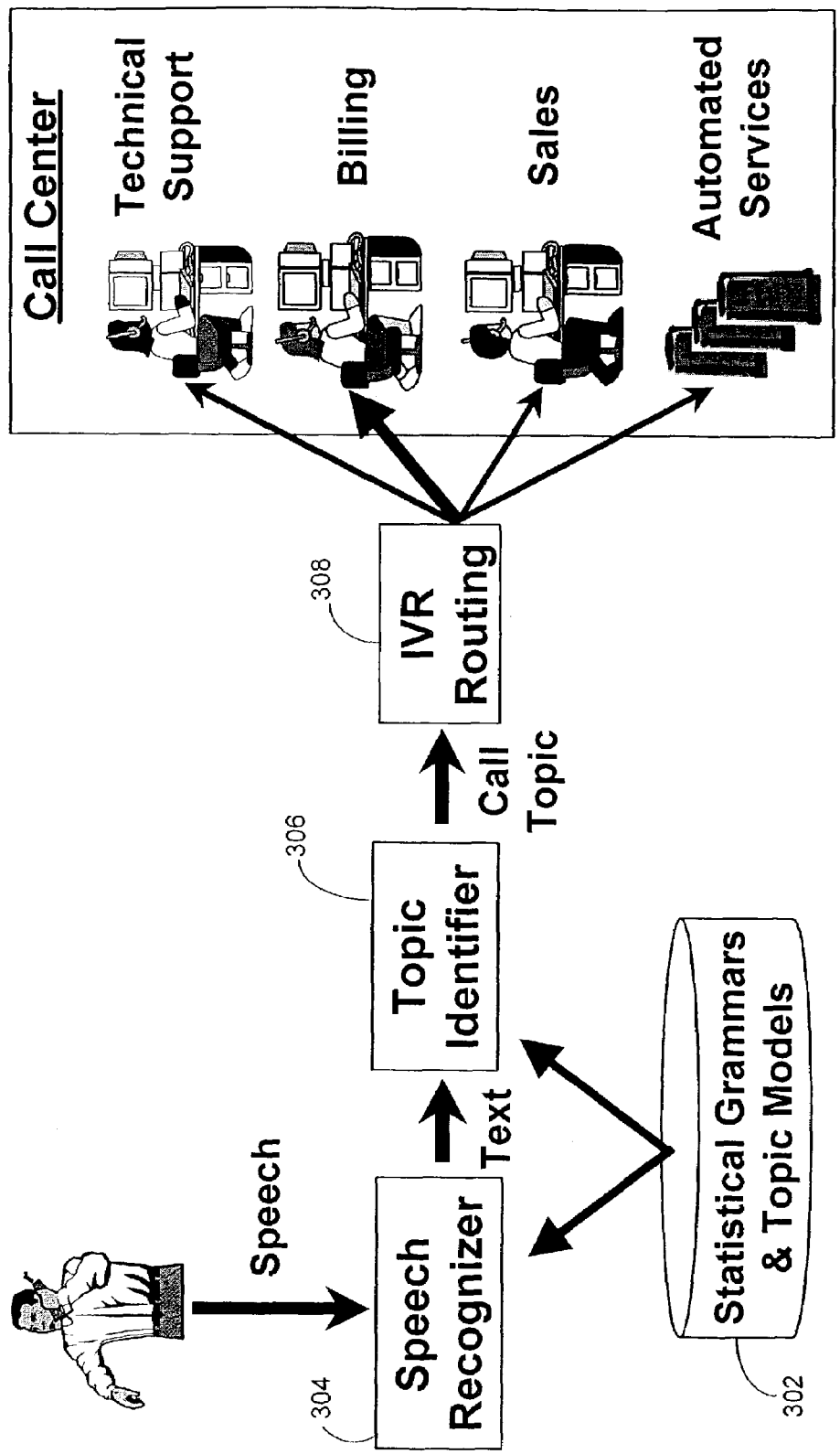
FIG. 2 is a diagram illustrating the architecture of a natural language call routing system.
Figure 3:
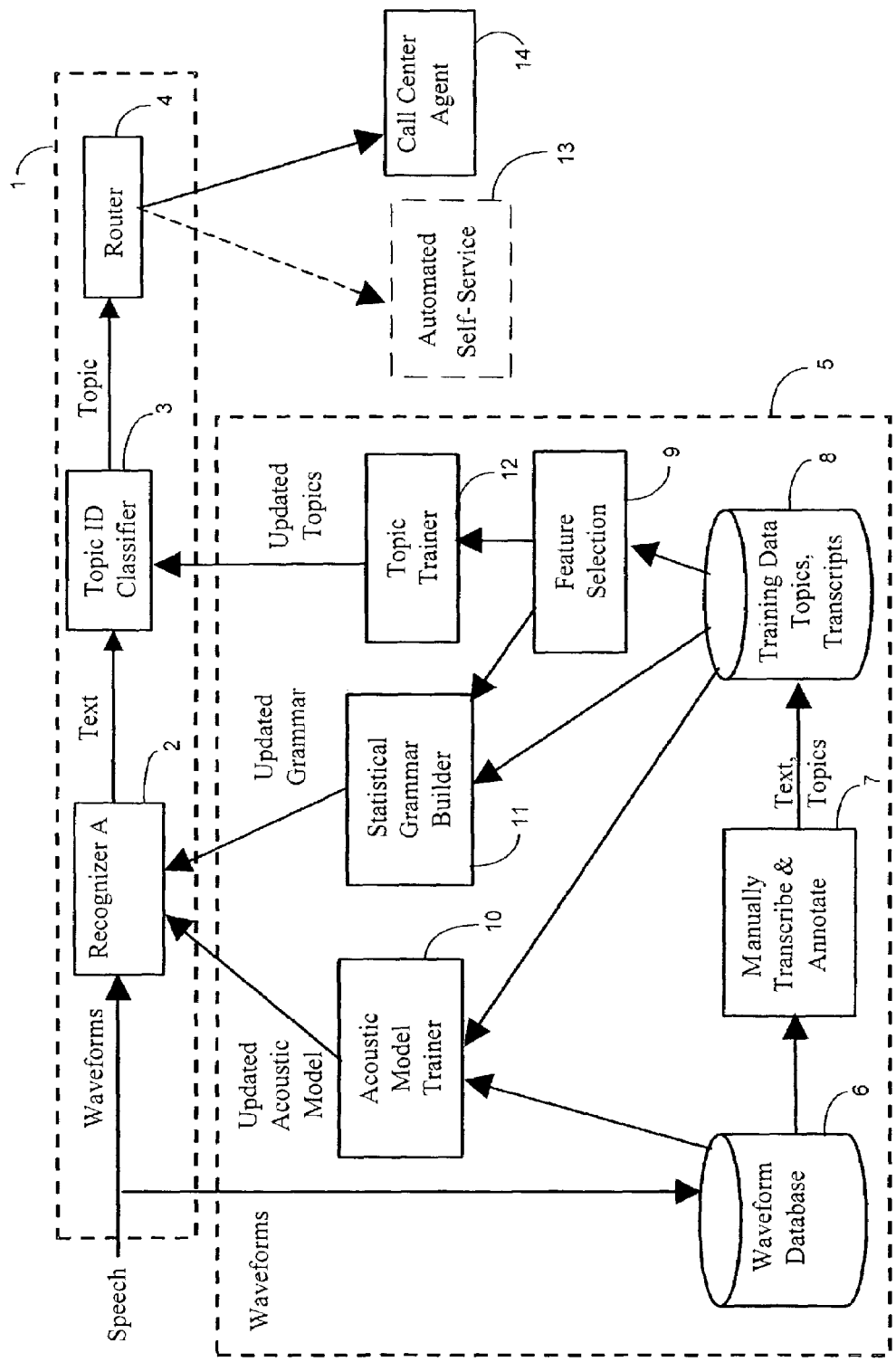
FIG. 3 is a diagram illustrating a conventional approach for training a natural language call routing system.
Figure 4:
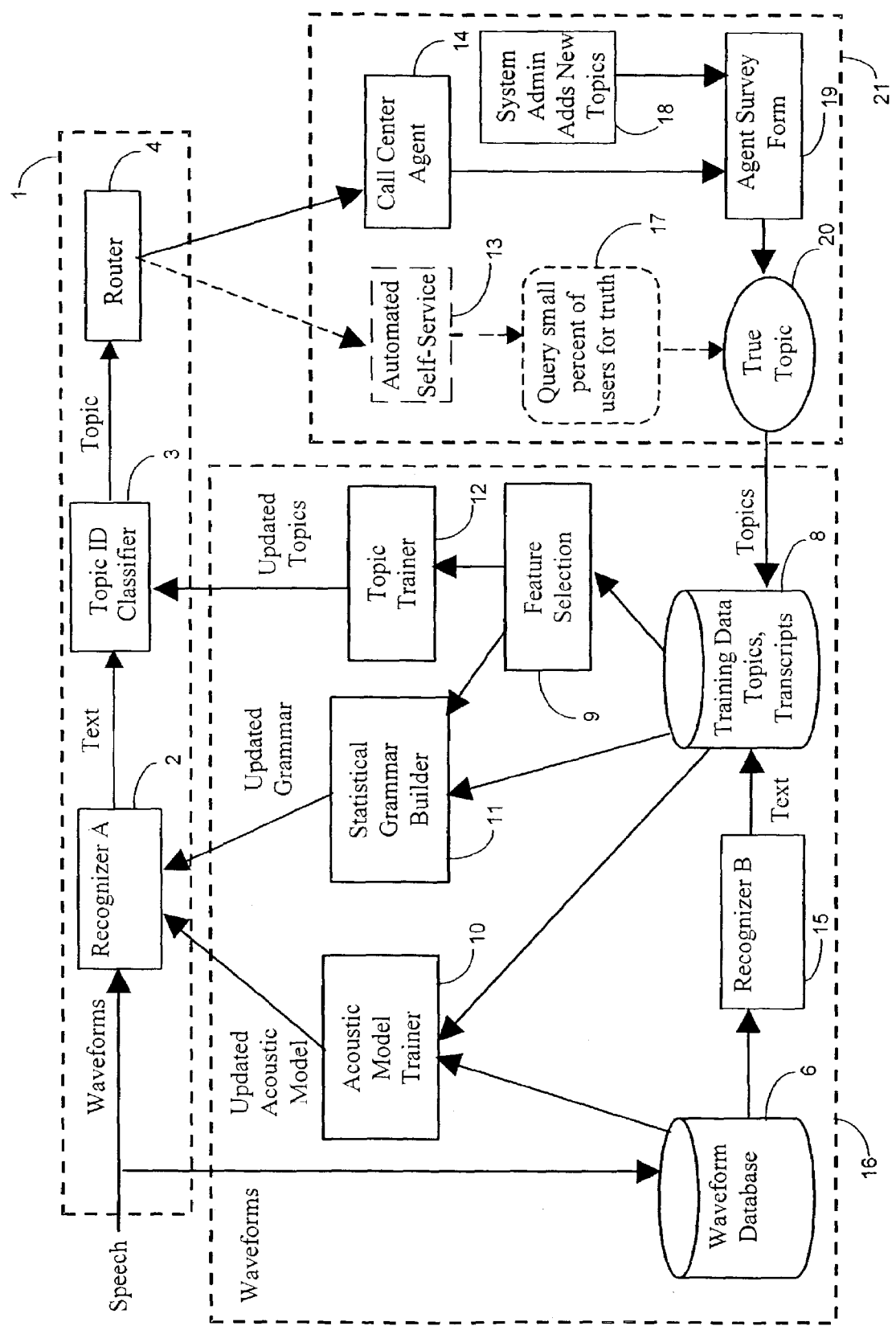
FIG. 4 is a diagram illustrating an unsupervised method of training for a natural language call routing system in accordance with the present invention.

An exemplary embodiment of a trainer in accordance with the present invention is illustrated in FIG. 4. In this approach, the functionality provided by human transcription and annotation process 7 from FIG. 3 has been split into two parts: an automated transcription function, performed by a second speech recognizer 15, preferably running as a background process, and an online topic annotation component 21, which utilizes feedback from a call center agent regarding the true reason for the call based on his/her dialogue with the caller.

As shown in FIG. 4, the trainer 16 is adapted to be used with a natural language call routing application 1. The natural language call routing application 1 has a speech recognizer 2 which converts the caller's speech into text, a topic ID classifier 3 that determines the topic from the text, and instructs the IVR-router where to send the call, whether to an automated self-service 13 or to a call center agent 14.

In the unsupervised trainer 16, spoken responses to a routing prompt are recorded to collect audio data, which is then stored in a waveform database 6, using the audio logging feature typically provided with an IVR platform. The stored audio signal is fed to a speech recognizer 15, which performs a highly accurate text transcription of the audio files. This element differs from in the trainer 5 illustrated in FIG. 3, which uses human transcription and annotation 7 to supply both text and topics to the training database 8. In the present invention, the functionality previously performed by the transcription and annotation 7 element of the conventional trainer is performed by a combination of elements.

In particular, the speech recognizer 15 in the unsupervised trainer 16 analyzes the audio files stored in the waveform database 6 to provide a highly accurate text transcription of the audio, which transcription is supplied to the training database 8. As will be described in greater detail below, the speech recognizer 15 of the trainer is preferably one that is highly accurate. This is necessary since it is replacing manual transcription to supply training data. On the other hand, the speech recognizer 2 of the call routing system must be able to recognize speech "on-the-fly", i.e., while a caller is waiting to be routed. Thus, there is a practical limit to the accuracy that can be obtained in such a short period of time. This is not the case with the speech recognizer 15 in the trainer, which can run in the background or at off-peak times.

The topic annotation functionality, which was performed manually in the conventional trainer, is performed in the present invention by an online annotation component 21, which utilizes an agent survey form 19 and a truth-query 17 of a small percentage of callers who utilize automated self-service 13, as shown in FIG. 4. The annotated topics are supplied to the training database 8. The elements 15 and 21 will be described in more detail below.

Because the present invention separates the function of transcription and topic annotation, transcriptions and topics must be tagged properly so that the system associates the correct topic with the corresponding transcription. Such tagging entails assigning a unique call identifier to all data corresponding to a particular call. The presence of such an identifier allows the separately-gathered data to be correlated once it has been stored in the training database 8.

Tagging preferably is done as follows. First, the waveform database 6 is augmented with an automatically generated unique identifier for each stored audio file. For each audio file, the transcription generated by the speech recognizer 15 is indexed with the same unique identifier. The online annotation component 21 annotates each transcribed text file with one or more topics and these annotated topics are also indexed by the unique identifier for that transcribed text file, which is the same as the unique identifier for the corresponding audio file. The unique waveform identifier thus provides a mechanism by which the various processing information (transcriptions, annotations) can be associated with each audio waveform.

The unsupervised trainer 16 of the present invention uses the same feature selection 9, topic trainer 12, statistical grammar builder 11, and acoustic model trainer 10 components, as in the conventional trainer. That is, feature selection 9 is performed on the training database 8 data, gathered as described in foregoing paragraphs. The features are the words from the training data; these must be ranked by how well they help to separate the training examples into their labeled topics. The feature selection increases the efficiency of the speech recognition process by reducing the size of the active dictionary that must be searched. For example, the well-known Kullback-Leibler distance metric (KLD), discussed above, could be used. If the KLD is large, the word is deemed to be useful in categorizing future queries.

The topic trainer 12 uses the data from the training database 8, as modified by feature selection 9, to build statistical models of how the selected feature words relate to the topics. As in the conventional trainer, a maximum likelihood estimation algorithm, discussed previously, is used to build the statistical models.

Next, a statistical grammar builder 11 for a speech recognizer is run on the collected transcribed data. This unit uses the vocabulary found in the training data, typically greater than 1000 words, and a list of keywords selected by the feature selection process 9 to construct statistical grammar relating to approximately 800 words to be input to the recognizer 2. This element functions in the manner described above in connection with the conventional trainer.

The speech recognizer 2 of the call routing application 1 uses a speech recognition process to turn input speech into text in an online system using the resulting grammar. The speech recognizer 2 supports statistical language models, that is, is able to use statistical grammar input to it by the statistical grammar builder 11 in the speech recognition process.

Finally, topic ID classifier 3 takes the text output by the speech recognizer 2 and, using the input classifier configuration data from the topic trainer 12, generates a list of topics and confidence scores which it passes to the IVR router 4. The topic ID classifier 3 functions in the same way as the corresponding element in FIG. 3.

In the preferred embodiment, the acoustic model trainer 10 is utilized, which contains acoustic models that include a dictionary of all words in the transcribed text. The acoustic model trainer 10 uses the dictionary, transcribed text from the training database 8, as well as the waveforms from the waveform database 6 that are associated with the transcribed text, to train quantization codebooks and associated mass functions in the VQ model. Training is performed using the standard Baum-Welch algorithm, discussed previously.

As discussed above, the speech recognizer 15 used in the trainer 16 according to the present invention preferably differs from the speech recognizer 2 that is used in the natural language call routing application 1. Preferably, because its output will be used as training data, a highly accurate speech recognizer 15 is used. However, because the speech recognizer is highly accurate, it will run slower and require more resources than the recognizer 2 used in the call routing application 1 itself, which must perform "on-the-fly", or in real-time, i.e., while the caller is waiting to be routed.

An example of speech recognizer that would be suitable to generate highly accurate transcriptions is a multiple-pass recognizer that uses more sophisticated acoustic and language models to generate high quality transcriptions. Such a recognizer is produced by BBN, under the Trademark BBN BYBLOS™ speech recognizer. The BBN BYBLOS™ speech recognizer uses a two-pass search algorithm for better use of context information including quin-phone, state-clustered tied mixture acoustic models along with powerful stochastic n-gram language models. Such a two-pass search algorithm is described in U.S. Pat. No. 5,621,859 to Schwartz et al, which is herein incorporated by reference in its entirety. The recognizer 15 also generates an n-best list or a lattice that is used in subsequent re-scoring passes to further improve recognition accuracy as well as to generate additional metadata such as word and sentence level confidence scores. An n-best list is a ranked list of the (top n) recognition hypotheses for a particular utterance while a lattice is a more complete network graph that contains all the top choice hypotheses for a particular utterance. As described below, the transcribed text from the recognizer 15 along with the other metadata (confidence scores, lattice) is used to train better models for the production speech recognizer 2.

To avoid interruption of the normal system operation that would be caused by the use of such a highly accurate speech recognizer 15, the unsupervised training preferably is performed in the background, or in off-peak hours when system resources are available. As mentioned previously, one of the functions of the recognizer 15 is to generate n-best outputs (top n transcriptions of speech) and give confidence scores for its output. The confidence scores for a transcription are a function of the posterior probability of that transcription being correct. By using the confidence score, or a function thereof, as a weight during the training process each utterance can be appropriately emphasized or discounted. This is advantageous compared with the conventional trainer 5, which uses manual transcription and annotation to generate text and topic training data, because, rather than the transcriber having to make a hard decision about whether or not to use a particular utterance for training, a "softer" decision can be made by the recognizer 15 to appropriately discount transcriptions that are relatively less reliable but that might still contain useful information. Experimental evidence indicates that this approach is desirable and has the ability to improve performance on some data sets.

The sequence of events for the present invention for a caller being handled by the system will now be described. The caller speaks in response to an open-ended prompt, such as, "Please tell me the reason for your call." The caller utterance is logged to a waveform database 6 for later analysis. The speech recognizer 2, topic ID classifier 3, and IVR router 4 handle the call in the same manner as previously described in relation to a system without unsupervised training. The calls are sent to either an area of the IVR where the callers can get self-service automation 13, or to a call center agent 14.

Figure 4A:
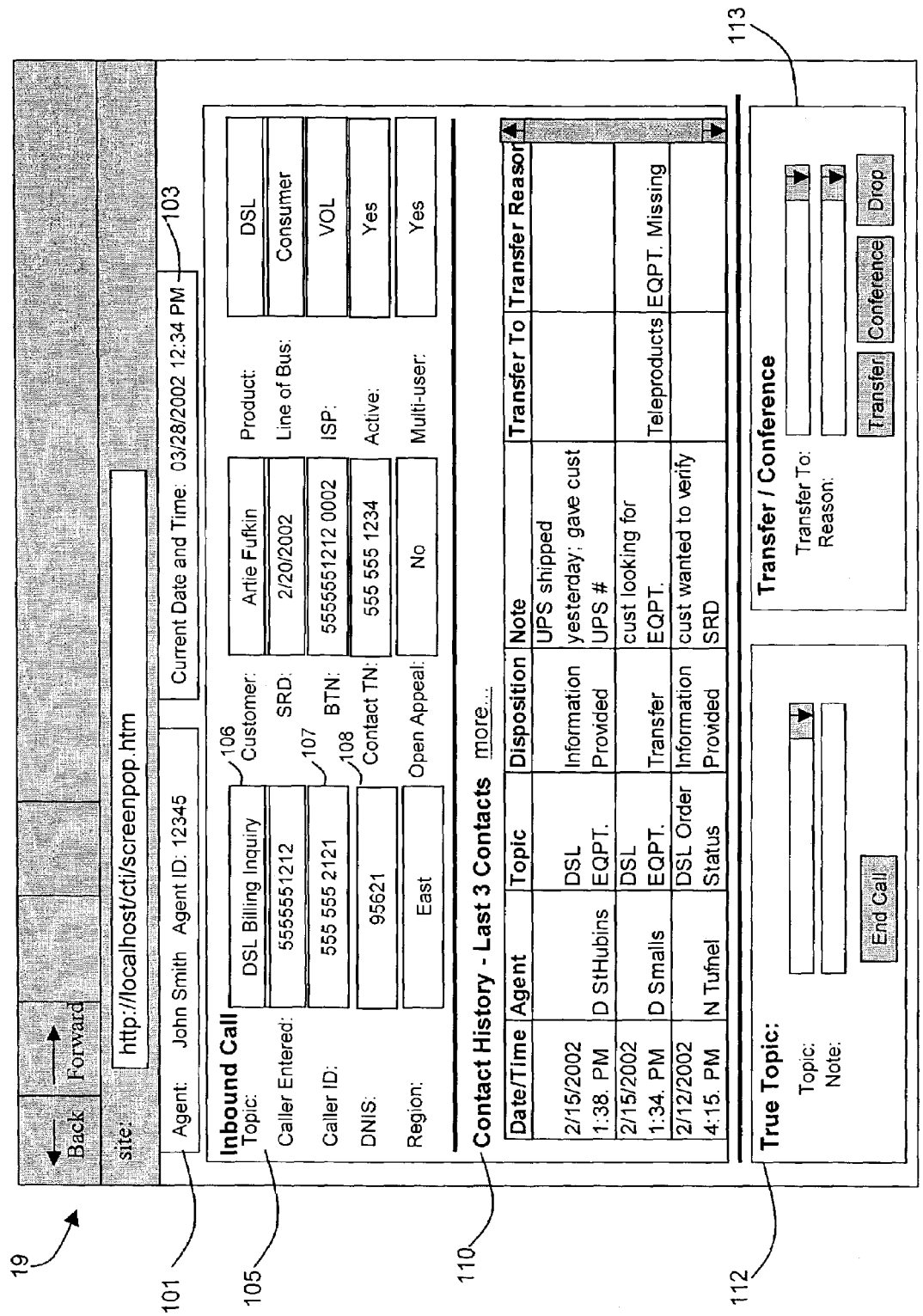
FIG. 4A illustrates an exemplary Web-based form which the agent can enter the true topic of a call.

If the call is sent to an agent, after the call is completed with the agent, the agent makes a determination about the topic of the call and enters the topic into a Web-based form 19. A typical embodiment of the Web-based form would be based on the use of a Web browser and associated HTML code to display the various fields and pull-down menus to be used by the agent to quickly and easily enter the topic information, in the well-known manner. FIG. 4A is an example form 19 that can be used by the agent to enter the topic information. As can be seen in the figure, areas are provided for entering various call information. The topic data entered by the agent 14 on the form, as well as the topic identified by the topic ID system for the call in question, are stored in a database accessible by the unsupervised trainer 16.

FIG. 4A shows an exemplary Web-based form 19 for use in the present invention. As shown in FIG. 4A, the form 19 preferably includes a number of fields. An agent information field 101 includes, for example, the agent's name and ID number. This would typically be supplied to the form from the agent logging in and providing his/her name and "Agent ID," which could be the agent's extension or node ID in the IVR. A current date and time field 103 includes the date and time, and is preferably filled by a system wide clock, as is well known.

An inbound call area 105 of the form 19 contains a number of fields. Among those is the topic field 106, which would be supplied automatically by the speech-enabled call routing system 1. In particular, this displayed topic is the output from the topic ID classifier 3. Example topics would include: Billing-DSL, Tech-Dialup, Cancel, Order-Equipment, and the like. The caller ID field 107 contains the caller ID assigned to the caller. If the call is transferred, this field contains the original caller ID from the initial caller, not from the transfer. The DNIS field 108 contains the number on which the call came in at the local public exchange (PBX).

Other fields in the inbound call area 105 may include a geographical region field, a customer (name) field, a service ready date (SRD) field, a billing telephone number (BTN) field, and the like. These fields are static customer data fields pulled from the local IVR database.

The contact history area 110 of the form 19 contains the three most recent contact history records pulled, for example, from a centralized contact history database of the call center. A link "more . . . " may be clicked by the agent to access more contact records from the IVR database, for example, in further increments of 3

The true topic field 112 contains a drop down list that contains a list of all possible topics used by the topic ID engine. The agent selects from this list the topic that best matches the true reason for the call based on his/her interaction with the customer. Example topics would include: Billing-DSL, Tech-Dialup, Cancel, Order-Equipment. A sub-field "note" would allow the agent to enter up to 50 alphanumeric characters that should be stored with the call result record.

Preferably, a transfer/conference field 113 would be included on the form. This field would include a drop down list that is built and maintained by the call center to be used to associate a department to a telephone number. The call center needs a maintenance screen to allow managers to add new entries, edit existing entries, and inactivate entries. The agent must choose a reason from the Reason drop down before pressing the Transfer button is pressed to initiate the transfer.

The reason field includes a drop down list that is built and maintained by call center. The call center needs a maintenance screen to allow managers to add new entries, edit existing entries, and inactivate entries.

Additional topic information is obtained by querying the self-service callers 13 to determine whether they were routed to the correct destination in the IVR. Preferably, a query of a small percentage of self-service callers is performed in the online annotation. For example, a simple yes/no question is posed to the caller, such as "did you get routed to the correct destination in the IVR?" If the caller answers no, then the caller is sent to an agent who can assist the caller and establish the true topic, where it preferably would be entered on the Web-based form 19. If a caller answers yes, then the system-identified topic is regarded as the true topic 20. The discerned true topic is then stored in a training database 8. This topic data entry, together with the entry of topic data by the agent on the form 19, function to replace the manual topic annotation of the conventional trainer.

The waveform database 6 and training data base 8 must use a common unique identifier (UID) to label callers for future cross-referencing of results used by the offline trainer. Typically this UID is assigned by the IVR or Automated Call Distributor (ACD)/Computer Telephony Integration (CTI) configuration used in the call center and is passed from element to element of the trainer and the call-routing application. Example database entries of a type that may be used to perform this function in the present invention are given below:

An example of the database entry for the recorded caller utterance is:

UID: march__10__2001__10__14__15

Data: <binary audio data>

An example of the database entry for the true topic:

UID: march__10__2001__10__14__15

Topic1: Billing

Topic2: <none>

An example of a database entry for the transcription is:

UID: march__10__2001__10__14__15

Transcription1: "I would like to speak to someone about a billing question"

Transcription2: "I would like to speak with someone about a question"

Score: 0.9

An example of a database entry for the system selected topic is:

UID: march_10_2001_10_14_15

Topic1: "Billing"

Topic2: "Agent"

Topic3: "Other"

Score1: 0.8

Score2: 0.1

Score3: 0.1

Where Score is the confidence score associated with the transcriptions and topics.

The system administrator 18 may occasionally update the topics that the system can utilize; he or she may add or delete topics to the form 19. The new topics are then mapped either to existing automated self-service destinations in the IVR or to the appropriate agent queue. The topics are added to the agent survey form initially, along with the destination associated with the topic. This process would be hidden from the agent, but would be entered into the database part of the Web-based form.

Once enough data about a new topic is gathered, the training process is performed to establish the statistical models to map the callers' words to the topics. Typically a few hundred utterances are collected for each topic. For the more frequently encountered topics the amount of training data collected might be higher. When the models are updated to take into account the new topics, those new topics become part of the new configuration, both for use by the statistical grammar builder 11, whose output is applied to the speech recognizer 2, and the topic ID configuration of the topic trainer 12, whose output is applied to the topic ID classifier 3.

Figure 5:
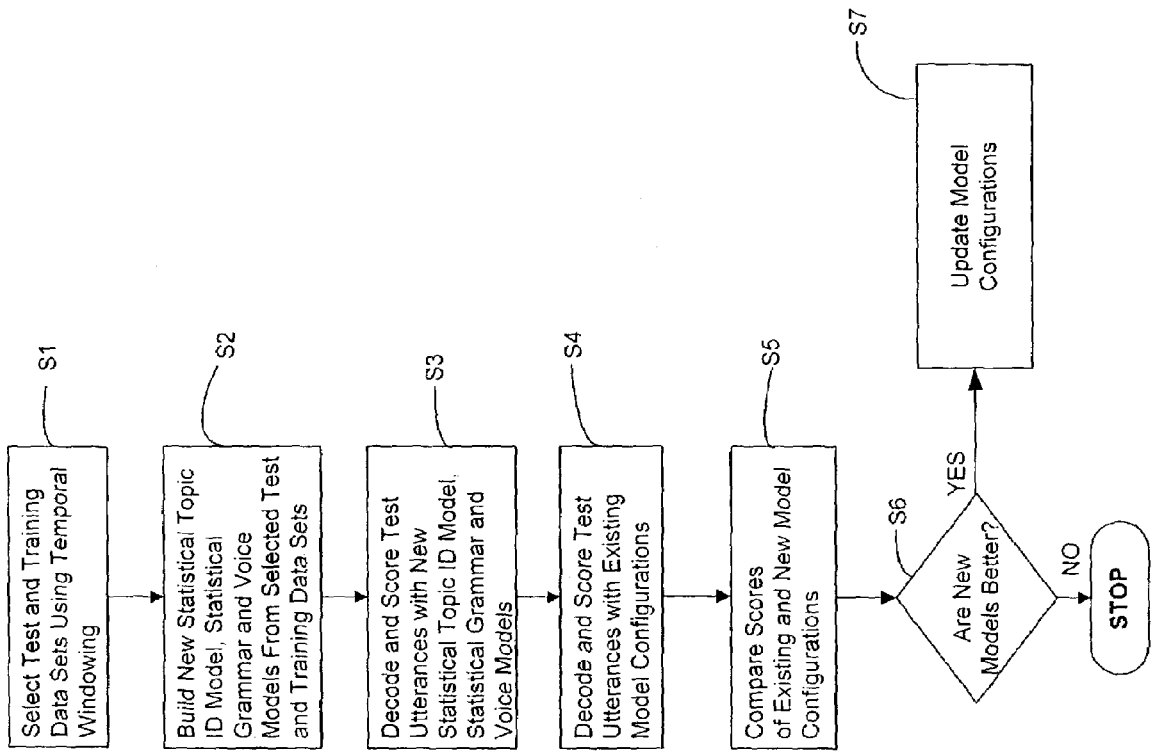
FIG. 5 is a flow chart illustrating the steps executed to determine whether updating of the call routing system is desirable.

At predetermined intervals the online trainer will perform the previously described topic, statistical grammar, and voice model training, and update, using training data from database 8. Updating the system with the topic, statistical grammar and voice models that result from the training comprises the steps shown in FIG. 5.

First, at step S1, using temporal windowing, both test and training sets of data are selected from the training data database. The test set, which establishes ground truth for evaluation the performance of the new models, may be selected in an automated process, but preferably would be manually transcribed and annotated with topic information. The latter part of the process would not be automated; as such, updates to the test set would generally occur with less frequency than updates to the training set. The straightforward approach to temporal windowing is to chronologically divide the data into segments ordered based on the month in which they were collected. Then, by using a radioactive decay model for the declining relevance of old data segments, a suitable data set for training can be selected.

For example, if data has been collected from the current month, M0, and from the previous t months M–1, . . . , M–t, and in the current month you collected N0 sample training utterances, then from month M–t, N=N0*e^(–lambda*t) examples should be randomly selected to add to the training set, where lambda is the decay constant. It has been found preferable to use a lambda of 0.1155, which corresponds to a half-life of 6 months. Thus, if you had collected 10,000 samples in the most recent month and you had a collection from half a year ago, all 10,000 recent examples plus 10,000*e^(–0.693)=5000 samples from the older collection should be used. The determination of the optimal decay constant, lambda, can be reached through experimentation. When recent data is scarce, the above approach can be modified so that N0 is normalized by the e^(lambda*t) value of the largest segment, M–t.

Then random drawing, with replacement, is performed from all the segments where N is greater than the number of utterances collected for that segment. The above approach is used to select the training set. The test set can be selected using the same method or can be drawn only from the most recent data collection. The choice depends on which set is most representative of future expected utterances.

Second, at step S2, new model configurations (statistical topic ID models, statistical grammars and voice models) are built. The statistical grammar builder is a process that takes the training utterances and generates a bi-gram language model that is input into recognizer 6.

In one embodiment of the present invention, the topic identification system uses a multinomial model for keywords and incorporates two different classifiers: a Bayesian classifier and a Log Odds classifier. In addition, the topic identification system can also support rejection, whereby utterances with low confidence can be rejected and reprompted.

Experience with topic identification has shown that some words are more important than others. For example, if the caller's response to the initial greeting is, "I am calling to dispute a charge on my bill", then the words bill and charge are important from the perspective of topic classification whereas the words am, to, on, etc. are clearly irrelevant. Also the set of words that are useful in identifying a topic varies from topic to topic; this set of useful words is often referred to as a keyword set. In order to boost the performance of the topic classification algorithms, the keywords for each topic are preferably automatically identified using information theoretic measures such as the Kullback-Leibler measure. The recognition grammar for the speech engine is also designed to provide better recognition performance on the keywords. By default, the keyword set contains all the words in the vocabulary.

A caller's response can be defined as a sequence of words $r=\{r\}$, where each word $r_i \epsilon W=\{W_1, \ldots, w_M\}$. W is a keyword set of M words and includes a non-keyword symbol which substitutes for any word in the response that is not a keyword. R is defined to be the set of all possible caller responses and $T=\{t_1, \ldots, t_N\}$ as the set of all system topics. The probability density functions of the caller's response conditioned on topics can be modeled as a multinomial distribution as follows:

$$p(r|t_j) = \prod_{i=1}^{M} p(r_i|t_j)^{n_i(r)}$$

$n_i(r)$ is the number of times words $w_i$ occurs in r. The parameters $p(w_i|t_j)$ of the multinomial model are trained using maximum likelihood (ML) estimation. Given a finite set of labeled training utterances $X=\{(r^k,t^k)\epsilon R \times T\}$, for each $i=1, \ldots, M$ and $j=1, \ldots N$, we compute $n_{ij}$=the number of occurrences of word $w_i$ in all responses labeled for topic $t_j$. The ML estimate for $p(w_i|t_j)$ is:

$$\hat{p}\left(w_i|t_j\right) = \frac{n_{ij} + \frac{M_j}{M}}{\sum_{i=1}^{M} n_{ij} + M_j}$$

$M_j$ denotes the number of unique words that occur in topic $t_j$. The estimation equation above uses the well-known Bell-Witten back-off strategy to account for words that were not seen in the training data for a certain topic. In addition, the ML estimate also is used for the prior probabilities of each topic, by using the frequency of the topics' occurrence among the training samples in X.

Given the probabilities $p(r|t_j)$ and a priori probability distribution $P(t_j)$ for the set of topics T, a Bayesian classifier is constructed for maximizing the posterior probability $p(t_j|r)$ $\forall j$, where, $$p(t_j|r) = \frac{p(r|t_j) \cdot p(t_j)}{p(r)}.$$

The topic identification system returns a list of topics which have the probability $p(t_j|r)$ above the rejection threshold specified to the system. The topic with the highest probability is generally used to route the call to a particular agent pool. In the case where no topic has a probability $p(t_j|r)$ above the rejection threshold, the topic identification system returns a NULL topic to the call routing application 1.

Given the probabilities $p(r|t_j)$ and a priori probability distribution $P(t_j)$ for the set of topics T, a log odds classifier is constructed to maximize the posterior topic log odds for the caller response:

$$\log\left[\frac{p(t_j|r)}{1-p(t_j|r)}\right] = \log\left[\frac{p(t_j)}{1-p(t_j)}\right] + \log\left[\frac{p(r|t_j)}{1-p(r|t_j)}\right].$$

Again as in the Bayesian classification framework, the topic identification system returns a list of topics with posterior log odds greater than the rejection threshold.

The stochastic speech recognition grammar is trained from the same set of training transcriptions that is used to train the topic ID models. First the keyword set is identified. Then using our language model training tools we generate the n-gram counts for the keyword set. The n-gram counts are accumulated as follows. For n=2, the count for the keyword pair (word1, word2) is accumulated by counting how often word2 occurs after word1. This accumulation is done for all possible keyword pairs. For n=3, the count for the keyword triplet (word1, word2, word3) is accumulated by counting how often word3 follows word2 when word2 follows word1. The accumulation of counts is similar for higher values of n. Finally, these counts are converted into n-gram probabilities such as p(word2|word1) which is the probability of word2 following word1. During recognition these probabilities are combined (using an appropriate weighting) with the probabilities (or likelihood scores) from the acoustic models to compute the final score for each hypothesis.

Third, at step S3, the test utterances are decoded and scored using the new updated modes. The first step in the decoding and scoring process is an offline process whereby the test utterances are manually transcribed and annotated. The manual transcription and annotation process establishes the ground truth for the test set; it would generally be updated on a periodic schedule, but much less frequently than the training data set. During testing, the test utterances are decoded using the trained acoustic models and the stochastic n-gram language model. Next, the recognition results are classified into one of the many different available topics using the trained topic ID models. Then two separate measurements are made. The recognized hypotheses are compared with the transcribed ground truth to compute the number of words that are in error. Also, the topic identified by the topic ID models is compared with the manually annotated topic to determine how many utterances are wrongly classified by the topic ID system. Using these measurements the Word Error Rate (WER) and the Topic Classification Accuracy (TCA) numbers are computed. The WER and the TCA are the scores used to determine the level of operation of the call routing system. The WER is the ratio of the number of incorrect, missing, and extra words divided by the number of words in the transcribed ground truth. The TCA is defined as the number of utterances from a test whose system-assigned labels match the reference truth divided by the total number of utterances in the test set.

Fourth, at step S4, the set of test utterances is decoded using the existing model configurations and scored against the manual transcriptions/annotations.

Fifth, at step S5, the scores of the decoded and scored test utterances, determined at the third and fourth steps, respectively, are compared in order to select the best configuration. Selection of the best configuration involves choosing a topic identification and speech recognition configuration that achieves the best topic accuracy on the selected set of test utterances.

Finally, at step S6, when/if the online trainer determines that the new models are better than the installed configuration, by comparing topic accuracy that results from the old and new models using the test utterances, at S7 an update is made to both the speech recognition grammar, voice model and the topic classifier configuration. That is, Speech Recognizer 2 is updated with the new speech recognition grammar and voice model and the topic ID classifier 3 is updated with the new topic models.

In an alternative embodiment, the training system may be adapted to focus only on callers who were identified as having been misrouted by the agent to help improve performance. From the perspective of the call routing system, utterances that are correctly routed by the system do not contain interesting or new information. As such, these utterances do not offer any potential learning opportunities for the system. In fact, by continuing to train on these utterances there is a risk of biasing the system towards better performance on a particular category of utterances at the expense of other categories. By selecting wrongly routed utterances for training, it is possible to improve on topics/utterances/callers for whom the system failed. Typically these are the topics for which the system is lacks sufficient training data or a subcategory, within a topic, that is underrepresented in the training data for that topic.

To maximize the benefit from this procedure it is necessary to iterate the above steps until system performance is stabilized. The actual algorithm used for training would be exactly the same as the technique described above except that the selection technique for the training data would changed to first verify that the system topic does not match the true topic (TopicRecord.Topic1 !=TruthRecord.Topic1).

In the alternative embodiment, the training database would have to store the system-derived topic, i.e., the topic derived by the call routing system.

The present invention has application to other speech recognition tasks as well as those described above. Examples include: the capture of account information, both numeric and alpha-numeric, the capture of yes/no responses, phrase grammars where the caller must match a pre-programmed response such as at a prompt "please say one of the following: billing, orders, cancel service, or technical assistance." In all of these cases, the speech recognition performance can be improved using unsupervised and offline training of acoustic models.

As has been discussed above, the present invention addresses the problems of the prior systems by providing techniques for unsupervised and offline training of, among other things, acoustic models for use by a speech recognition system. In accordance with the present invention, manual transcription of audio in the trainer is replaced with the output of a highly accurate speech recognizer. The auto transcription process can be supplemented with a manual process whereby the agents corroborate the information provided by the callers, as is the case with account numbers such as telephone numbers, using the same mechanism for feedback as described for training of the topic ID models. Finally, the unsupervised training process trains the new acoustic models and assesses when the new models are more accurate than the models currently in use.

In accordance with such an aspect of the present invention, the speech recognition system associates a unique identifier to an incoming call and has a first speech recognizer that recognizes speech input from a caller and outputs text corresponding to the input speech, and an associated call router that routes the caller to an agent or an automated fulfillment, using some or all of the information provided by the caller. This may or may not be in conjunction with the aforementioned natural language call routing using the topic ID technique. The unsupervised trainer tunes performance of the speech recognition system on the basis of feedback using both automatic and manual (agent supplied) transcription. Such a method of training comprises: storing audio data from an incoming call as well as associated unique identifier information for the incoming call in a waveform database; applying a second highly accurate speech recognizer to the audio data from the waveform database to produce a text transcription of the stored audio for the call; forwarding outputs of the second speech recognizer to a training database, that can store text transcripts from the second recognizer with respective unique call identifiers as well as topic data. Agents enter an account number, or other information, which is being captured by the speech recognition system, and determined by the agent, into a form. The account or other information from the form is supplied to the training database together with the associated unique call identifier. Voice model training is performed on the basis of the transcription and audio information stored in the training database.

In accordance with another aspect of the present invention, a speech recognition system associates a unique identifier to an incoming call and has a first speech recognizer recognize speech input from a caller and outputs text corresponding to the input speech, and a call router that routes the caller to an agent or an automated fulfillment in accordance with the information provided by the caller. The unsupervised trainer tunes performance of the speech recognition system on the basis of feedback and includes: a waveform database, which stores audio data from an incoming call as well as associated unique identifier information for the incoming call; a second highly accurate speech recognizer applied to the audio data from the waveform database to produce a text transcription of the stored audio for the call; a training database that can store text transcripts from the second recognizer with respective unique call identifiers; an online annotator including a form that allows entry of the true account number, or other relevant information determined by the agent for a call routed to the agent. The annotated topic information, together with the associated unique call identifier, is supplied to the training database together with the associated unique call identifier and; a voice model trainer performs voice model training on the basis of the transcription and audio information stored in the training database.

The above-described preferred embodiments of the present invention are for illustrative purposes. The present invention is not limited thereto and should be construed broadly, in accordance with the appended claims.

What is claimed is:

1. A method of training a natural language call routing system using an unsupervised trainer, the call routing system being adapted to associate a unique identifier to an incoming call and having a first speech recognizer adapted to recognize speech input from a caller and to output text corresponding to the input speech, a topic classifier adapted to identify a topic from the text output by the first speech recognizer, and a call router adapted to route the caller to an agent or an automated fulfillment in accordance with the identified topic, the unsupervised trainer being adapted to tune performance of the call routing system, the method of training comprising:

storing, in a waveform database, audio data from an incoming call and associated unique identifier information for the incoming call;

applying a second speech recognizer to the audio data from the waveform database to produce a text transcription of the stored audio for the call;

forwarding outputs of the second speech recognizer to a training database, the training database being adapted to store text transcripts from the second recognizer with respective unique call identifiers as well as topic data;

for a call routed by the call router to an agent:
  entering a call topic determined by the agent into a form; and
  supplying the call topic information from the form to the training database together with the associated unique call identifier; and for a call routed to automated fulfillment:
  querying the caller regarding the true topic of the call; and
  adding this topic information, together with the associated unique call identifier, to the training database; and performing topic identification model training and statistical grammar model training on the basis of the topic information and transcription information stored in the training database.

2. A method according to claim 1, wherein the trainer performs the statistical grammar model training by sending updated training data to a statistical grammar builder operable to output an updated statistical grammar model to the first recognizer on the basis of the updated training data.

3. A method according to claim 1, wherein the first speech recognizer is adapted for real-time speech recognition, to produce an output while the caller waits for the call to be routed, and the second speech recognizer is adapted to perform highly accurate speech recognition and to identify a confidence level for accuracy of its output text.

4. A method according to claim 1, wherein if the topic and statistical grammar training indicate that the topic identification and/or statistical grammar model being trained performs better than the topic identification and/or statistical grammar model currently implemented in the call routing system, an update is made to the speech recognition statistical grammar model and/or the topic identification model.

5. A method according to claim 4, wherein training comprises the steps of:
   selecting test data sets from the training database using temporal windowing;
   building a new topic identification model and statistical grammar model using training data from the training database, including test utterances;
   decoding and scoring the test utterances using the new topic identification model and statistical grammar model;
   decoding and scoring the test utterances using the current topic identification model and statistical grammar model;
   comparing the scores of the current and new topic identification model and statistical grammar model; and
   if the score for the new topic identification model and statistical grammar model are better, updating the model configuration to the new topic identification model and new statistical grammar model.

6. A method according to claim 1, wherein said performing step comprises applying feature selection processing to rank words by how well the words separate the training data stored in the training database into topics, and outputting feature selection processed data to a topic trainer that includes the topic identification model utilized by the topic classifier of the call routing system in determining the topic of the incoming call.

7. A method according to claim 6, wherein the feature selection processed data also is output to a statistical grammar builder that includes the statistical grammar model utilized by the first speech recognizer of the call routing system.

8. A method according to claim 7, wherein data from the training database and data from the waveform database are output to an acoustic model trainer which uses transcribed text from the training database, together with associated waveform data from the waveform database, to train an acoustic model utilized by the first speech recognizer.

9. A method according to claim 1, wherein the form is a Web-based form.

10. A system for unsupervised training of a natural language call routing system, the call routing system being adapted to associate a unique identifier to an incoming call and having a first speech recognizer adapted to recognize speech input from a caller and to output text corresponding to the input speech, a topic classifier adapted to identify a topic from the text output by the first speech recognizer, and a call router adapted to route the caller to an agent or an automated fulfillment in accordance with the identified topic, the system for unsupervised training being adapted to tune performance of the call routing system, the unsupervised training system comprising:
   a waveform database, adapted to store audio data from an incoming call and associated unique identifier information for the incoming call;
   a second speech recognizer adapted to be applied to the audio data from the waveform database to produce a text transcription of the stored audio for the call;
   a training database, the training database adapted to store text transcripts from the second recognizer with respective unique call identifiers as well as topic data;
   an online topic annotator including a form adapted to allow entry of a call topic determined by the agent for a call routed to the agent and, and a true topic entry unit for entry of a call topic gathered from querying the caller regarding the true topic of a call, for a call routed to automated fulfillment, the annotated topic information, together with the associated unique call identifier, being supplied to the training database together with the associated unique call identifier;
   a topic trainer adapted to perform topic identification model training on the basis of the topic information and transcription information stored in the training database; and
   a statistical grammar builder adapted to perform grammar model training on the basis of the topic information and transcription information stored in the training database.

11. A system according to claim 10, wherein the trainer performs the statistical grammar model training by sending updated training data to said statistical grammar builder, said statistical grammar builder being operable to output an updated statistical grammar model to the first speech recognizer.

12. A system according to claim 10, wherein the first speech recognizer is adapted for real-time speech recognition, to produce an output while the caller waits for the call to be routed, and the second speech recognizer is adapted to perform highly accurate speech recognition and to identify a confidence level for accuracy of its output text.

13. A system according to claim 10, wherein if the topic and statistical grammar training indicate that the topic identification and/or statistical grammar model being trained performs better than the topic identification and/or statistical grammar model currently implemented in the call routing system, an update is made to the speech recognition statistical grammar model and/or the topic identification model.

14. A system according to claim 13, wherein the unsupervised trainer is adapted to:
   select test data sets from the training database using temporal windowing;
   build a new topic identification model and statistical grammar model using training data from the training database, including test utterances;
   decode and scoring the test utterances using the new topic identification model and statistical grammar model;
   decode and score the test utterances using the current topic identification model and statistical grammar model;
   compare the scores of the current and new topic identification model and statistical grammar model; and
   if the score for the new topic identification model and statistical grammar model are better, update the model configuration to the new topic identification model and new statistical grammar model.

15. A system according to claim 10, wherein said unsupervised trainer further comprises a feature selection processor adapted to rank words by how well the words separate the training data stored in the training database into topics, and output feature selection processed data to the topic trainer that includes the topic identification model utilized by the topic classifier of the call routing system in determining the topic of the incoming call.

16. A system according to claim 15, wherein the feature selection processed data also is output to the statistical grammar builder that includes the statistical grammar model utilized by the first speech recognizer of the call routing system.

17. A system according to claim 16, further comprising an acoustic model trainer, wherein data from the training database and data from the waveform database are output to the acoustic model trainer which uses transcribed text from the training database, together with associated waveform data from the waveform database, to train an acoustic model utilized by the first speech recognizer.

18. A system according to claim 10, wherein the form is a Web-based form.

19. A trainer for unsupervised training of a natural language call routing system, the call routing system being adapted to associate a unique identifier to an incoming call and having first speech recognizing means for recognizing speech input from a caller and outputting text corresponding to the input speech, topic classifying means for identifying a topic from the text output by the first speech recognizing means, and call routing means for routing the caller to an agent or an automated fulfillment in accordance with the identified topic, the trainer being adapted to tune performance of the call routing system, the trainer comprising:

a waveform database, adapted to store audio data from an incoming call as well as associated unique identifier information for the incoming call;

second speech recognizing means for producing, from the audio data from the waveform database, a text transcription of the stored audio for the call;

a training database, the training database adapted to store text transcripts from the second recognizing means with respective unique call identifiers as well as topic data;

online topic annotation means for providing to an agent a form adapted to allow entry of a call topic determined by the agent for a call routed to the agent and, and including a true topic entry unit for entry of a call topic gathered from querying the caller regarding the true topic of a call, for a call routed to automated fulfillment, the annotated topic information, together with the associated unique call identifier, being supplied to the training database together with the associated unique call identifier;

topic training means for performing topic identification model training on the basis of the topic information and transcription information stored in the training database; and statistical grammar building means for performing grammar model training on the basis of the topic information and transcription information stored in the training database.

20. A trainer according to claim 19, wherein the trainer performs the statistical grammar model training by sending updated training data to said statistical grammar building means, said statistical grammar building means being operable to output an updated statistical grammar model to the first speech recognizing means.

21. A trainer according to claim 19, wherein the first speech recognizer means is adapted for real-time speech recognition, to produce an output while the caller waits for the call to be routed, and the second speech recognizing means performs highly accurate speech recognition and identifies a confidence level for accuracy of its output text.

22. A trainer according to claim 19, wherein if the topic and statistical grammar training indicate that the topic identification and/or statistical grammar model being trained performs better than the topic identification and/or statistical grammar model currently implemented in the call routing system, an update is made to the speech recognition statistical grammar model and/or the topic identification model.

23. A trainer according to claim 22, wherein said trainer comprises:

means for selecting test data sets from the training database using temporal windowing;

means for building a new topic identification model and statistical grammar model using training data from the training database, including test utterances;

means for decoding and scoring the test utterances using the new topic identification model and statistical grammar model;

means for decoding and scoring the test utterances using the current topic identification model and statistical grammar model;

means for comparing the scores of the current and new topic identification model and statistical grammar model; and means for, if the score for the new topic identification model and statistical grammar model are better, updating the model configuration to the new topic identification model and new statistical grammar model.

24. A trainer according to claim 19, wherein said trainer further comprises feature selection processing means for ranking words by how well the words separate the training data stored in the training database into topics, and outputting feature selection processed data to the topic trainer that includes the topic identification model utilized by the topic classifying means of the call routing system in determining the topic of the incoming call.

25. A trainer according to claim 24, wherein the feature selection processed data also is output to said statistical grammar building means, said statistical grammar building means including the statistical grammar model utilized by the first speech recognizing means of the call routing system.

26. A trainer according to claim 25, further comprising acoustic model training means, wherein data from the training database and data from the waveform database are output to the acoustic model training means, which uses transcribed text from the training database, together with associated waveform data from the waveform database, to train an acoustic model utilized by the first speech recognizing means.

27. A system according to claim 19, wherein the form is a Web-based form.

28. A method of training a speech recognition system using an unsupervised trainer, the speech recognition system being adapted to associate a unique identifier to an incoming call and having a first speech recognizer adapted to recognize speech input from a caller and to output text corresponding to the input speech, and an associated call router which routes the caller to an agent or an automated fulfillment, using some or all of the information provided by the caller, the unsupervised trainer being adapted to tune performance of the speech recognition system on the basis of feedback using both automatic and manual transcription, the method of training comprising:

storing, in a waveform database, audio data from the incoming call as well as associated unique identifier information for the incoming call;

applying a second speech recognizer to the audio data from the waveform database to produce a text transcription of the stored audio data for the call;

forwarding outputs of the second speech recognizer to a training database, the training database being adapted to store text transcripts from the second recognizer with respective unique call identifiers as well as topic data;

agents entering information which is being captured by the speech recognition system, determined by the agent, into a form;

supplying the information from the form to the training database together with the associated unique call identifier; and performing voice model training on the basis of the transcription and audio information stored in the training database.

29. A system for unsupervised training of a speech recognition system, the speech recognition system being adapted to associate a unique identifier to an incoming call and having a first speech recognizer adapted to recognize speech input from a caller and to output text corresponding to the input speech, and a call router adapted to route the caller to an agent or an automated fulfillment in accordance with information provided by the caller, the unsupervised training system being adapted to tune performance of the speech recognition system on the basis of feedback, the unsupervised training system comprising:

a waveform database, adapted to store audio data from the incoming call as well as associated unique identifier information for the incoming call;

a second speech recognizer adapted to be applied to the audio data from the waveform database to produce a text transcription of the stored audio data for the call;

a training database adapted to store text transcripts from the second recognizer with respective unique call identifiers;

an online annotator including a form adapted to allow entry of true information determined by the agent, for a call routed to the agent, the annotated topic information, together with the associated unique call identifier, being supplied to the training database together with the associated unique call identifier; and a voice model trainer adapted to perform voice model training on the basis of the transcription and audio information stored in the training database.

* * * * *